United States Patent

Zagrodnik et al.

[11] Patent Number: 6,053,626
[45] Date of Patent: Apr. 25, 2000

[54] MOTORCYCLE DIRECTIONAL LIGHT BAR

[75] Inventors: Phillip J. Zagrodnik, Oconomowoc; Gregory S. Hahn, Franklin; James L. Hofmann, Mukwonago; Jack Kainz, West Allis, all of Wis.

[73] Assignee: Harley-Davidson Motor Company, Milwaukee, Wis.

[21] Appl. No.: 09/120,929

[22] Filed: Jul. 22, 1998

[51] Int. Cl.[7] ........................................... B62J 6/00
[52] U.S. Cl. ........................... 362/473; 362/541; 362/545
[58] Field of Search ................................. 362/473, 474, 362/475, 476, 496, 506, 540, 541, 545, 800, 249; 340/432, 473, 475

[56] References Cited

U.S. PATENT DOCUMENTS

| | | | |
|---|---|---|---|
| 4,598,339 | 7/1986 | Ainsworth | 362/473 |
| 5,406,465 | 4/1995 | Farchione | 362/234 |
| 5,617,303 | 4/1997 | Izzo, Sr. | 362/473 |

OTHER PUBLICATIONS

1994 Harley–Davidson Genuine Parts & Accessories—p. 59.

*Primary Examiner*—Y. Quach
*Attorney, Agent, or Firm*—Michael Best & Friedrich LLP

[57] ABSTRACT

A light emitting diode (LED) directional light bar assembly for use on a motorcycle includes a substantially rigid light bar having opposite ends. Apertures are defined generally adjacent each of the opposite ends by a rear-facing surface of the light bar. A lens is sized to fit at least partially within each aperture such that a surface of each lens is substantially flush with the rear-facing surface of the light bar. An LED pod including a plurality of LEDs is disposed adjacent each lens. Each LED includes a selected number of LED running lights wired to emit light during operation of the motorcycle, and a selected number of LED brake lights wired to emit light during operation of the motorcycle only when a motorcycle brake is applied. A retention plate or member is interconnected to the light bar generally adjacent each opposite end, and at least partially captures each LED pod and lens between the retention member and the light bar.

23 Claims, 4 Drawing Sheets

MOTORCYCLE DIRECTIONAL LIGHT BAR

FIELD OF THE INVENTION

The present invention relates generally to the field of motorcycle directional lights and specifically to motorcycle light bars.

BACKGROUND OF THE INVENTION

Many types of motorcycles include light bars for supporting directional lights. Typical motorcycle directional light bars include a generally horizontal light bar adapted to fit around a rear taillight or a rear fender of a motorcycle. Directional lights are usually attached to opposite ends of the light bar to enable the rider to indicate a left or right turn prior to executing the turn.

The taillight of a motorcycle is generally centrally located on the rear of the motorcycle, and is commonly separate from the light bar and directional lights. The taillight serves the two-fold purpose of a constant running light and a brake light which is activated by application of the motorcycle brakes. It is not uncommon for taillights of motorcycles to burn out after a period of use.

SUMMARY OF THE INVENTION

The present invention provides an improved directional light bar assembly for a motorcycle. The assembly includes a light bar adapted to be interconnected with the motorcycle and an LED mounted on the light bar. Preferably, the light bar has opposite ends, and the assembly further includes a directional light interconnected with each of the opposite ends of the light bar.

In one embodiment, the light bar includes an outer surface (e.g., a rear-facing surface) defining an aperture, and the LED is disposed generally adjacent the aperture to allow light from the LED to pass through the aperture. Preferably, a lens is positioned at least partially within the aperture, and the LED is disposed generally adjacent the lens (e.g., within a lens cavity). The lens can be positioned such that a surface of the lens is substantially flush with the outer surface of the light bar. In order to protect the LED, the light bar can be designed to form a cavity, and the LED can be at least partially received within the cavity. A removable retention member can be interconnected with the light bar such that the LED is at least partially captured between the retention member and the light bar.

In another embodiment, the LED actually comprises at least two LEDs: an LED running light and an LED brake light. The LED running light is configured to emit light when the motorcycle is running, and the LED brake light is configured to emit light only when the motorcycle brake is applied.

In a preferred embodiment, the light bar includes first and second apertures, and the LED includes first and second LEDs disposed generally adjacent the first and second apertures, respectively. For example, if the light bar includes opposite ends, the first aperture can be disposed generally adjacent one of the opposite ends and the second aperture can be disposed generally adjacent the other of the opposite ends. In this embodiment, the assembly can include two retention members for holding the LEDs in place.

The LED directional light bar assembly of the present invention supports the motorcycle directional indicator lights as a typical directional light bar would. However, the LED directional light bar assembly also functions as a taillight, serving the two-fold purpose of a running light and a brake light. The invention is intended to be used in conjunction with the normal taillight of a motorcycle, to provide additional running light and brake light capacity. The invention also acts as a backup to the normal taillight of a motorcycle, providing running and brake lights when the normal taillight of the motorcycle burns out or is otherwise damaged or rendered inoperable.

Because the lenses and LED pods of the present invention are substantially flush with the rear-facing surface, the LED taillight of the present invention is relatively unexposed to debris and other harmful objects that can damage a normal taillight and render it inoperable.

DETAILED DESCRIPTION

Figure 1:
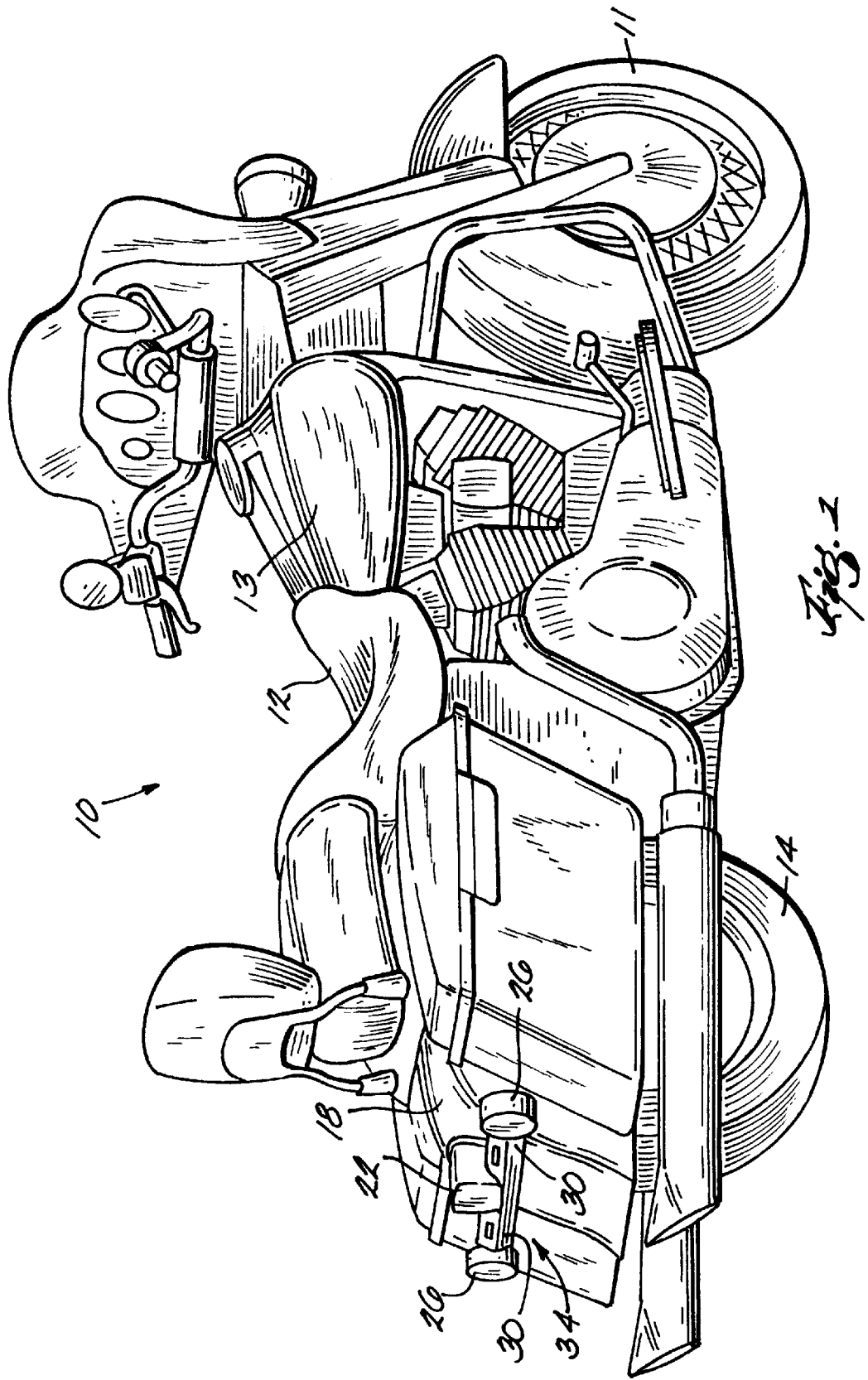
FIG. 1 is a perspective view of a motorcycle including the LED directional light bar assembly of the present invention.
Figure 2:
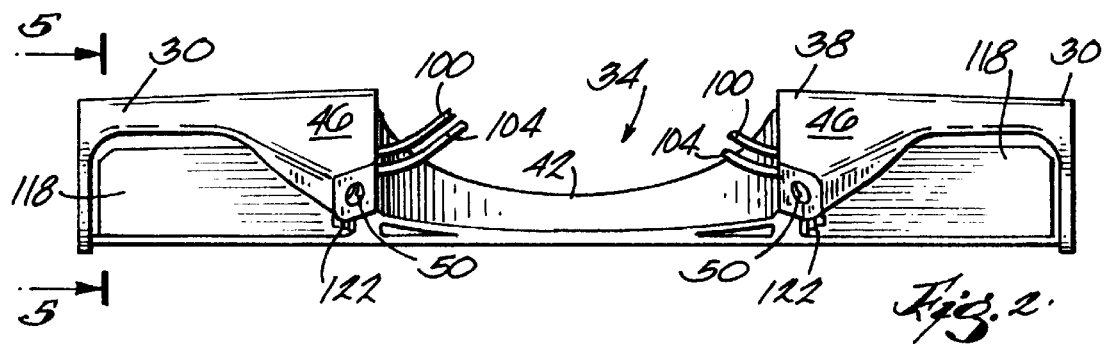
FIG. 2 is a front elevational view of the LED directional light bar assembly.

FIG. 1 illustrates a motorcycle 10 generally including a front wheel 11, a seat 12, a gas tank 13, a rear wheel 14, a rear fender 18, a taillight 22, and directional lights 26. The directional lights 26 are interconnected with opposite ends 30 of a directional light bar assembly 34.

FIGS. 2–5 illustrate the directional light bar assembly 34 in detail. The directional light bar assembly 34 includes a light bar 38 that may be made of a substantially rigid material, such as chrome plated steel or plastic, for example. A generally U-shaped or recessed center portion 42 of the light bar 38 is adapted to fit at least partially around a portion of the taillight 22. Bosses 46 with threaded holes 50 facilitate mounting the directional light bar assembly 34 on the rear fender 18 with suitable fasteners 54 (see FIG. 5). Mounting apertures 60 (see FIG. 4) are provided at each of the opposite ends 30 through which a threaded fastener may be passed to interconnect the directional indicator lights 26 to the light bar 38.

Figure 3:
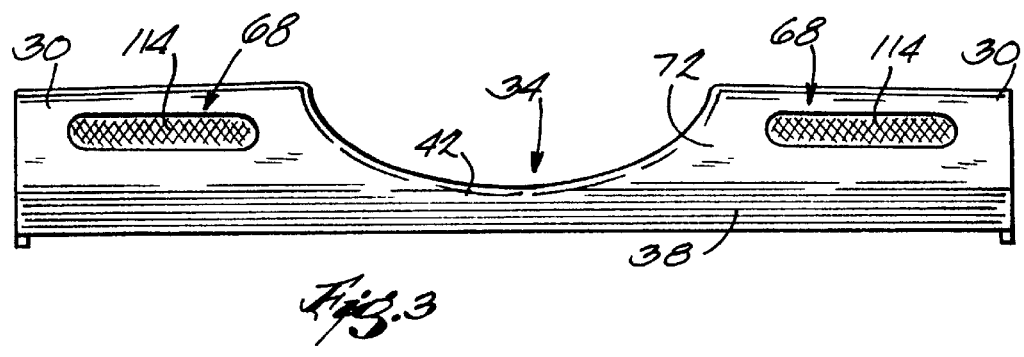
FIG. 3 is a rear elevational view of the LED directional light bar assembly.
Figure 4:
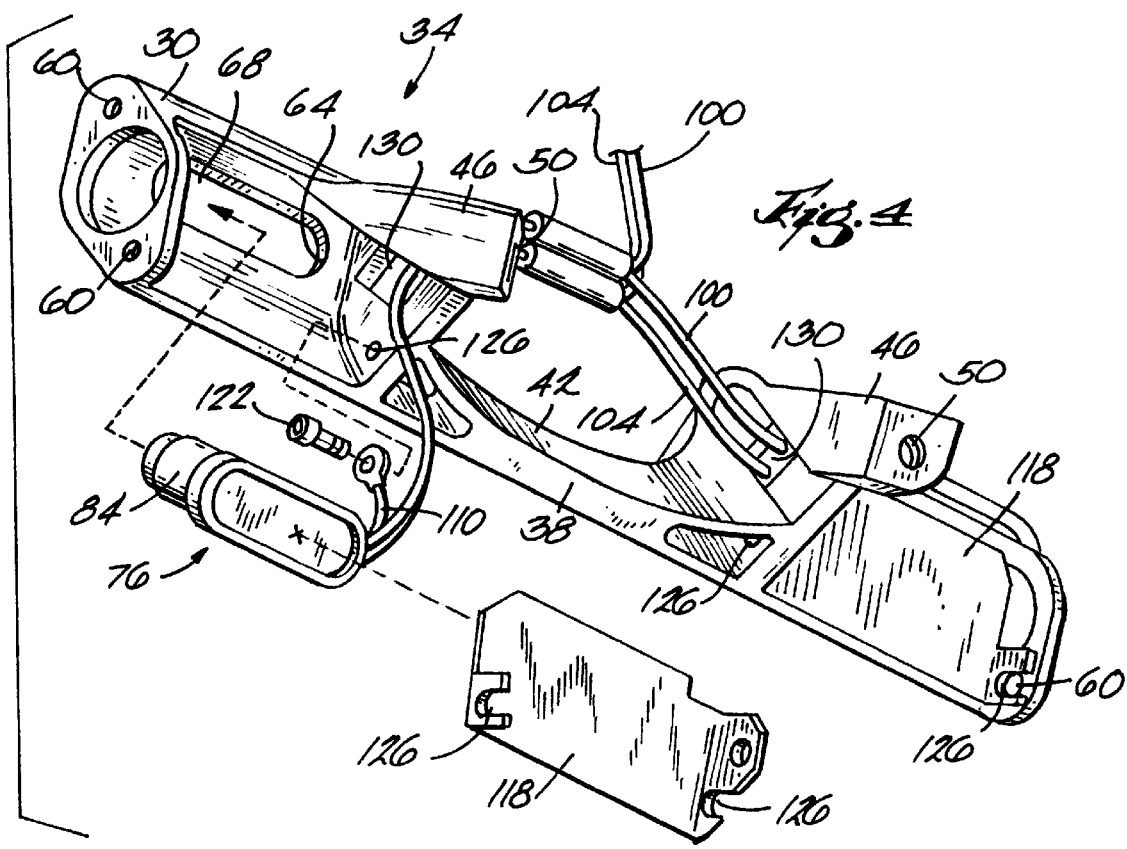
FIG. 4 is a partially exploded view of the LED directional light bar assembly.
Figure 5:
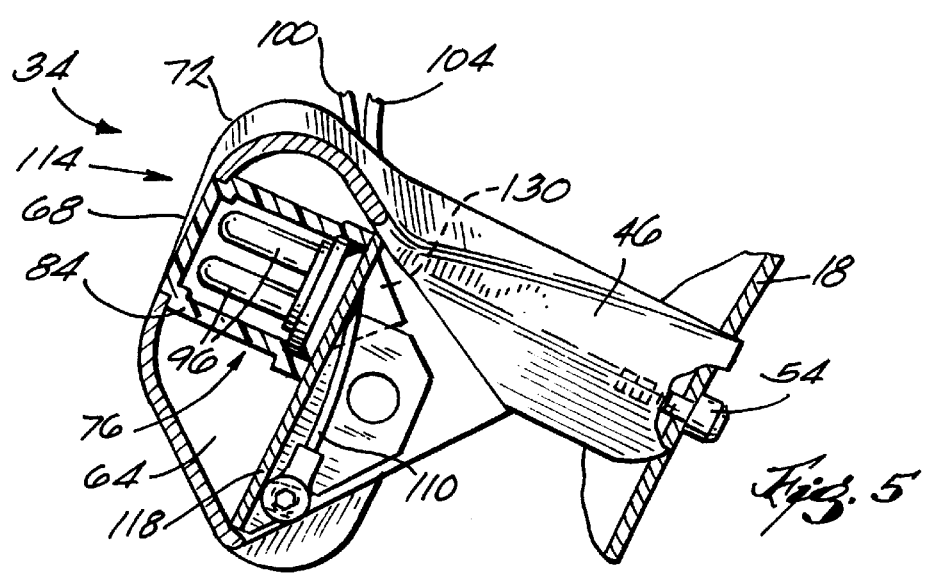
FIG. 5 is a cross section view taken along line 5—5 in FIG. 2.

Referring to FIGS. 4 and 5, the light bar 38 defines a cavity 64 generally adjacent each of the opposite ends 30. An aperture 68 is defined by an outer or rear-facing surface 72 of the light bar 38 (see FIGS. 3 and 5) generally adjacent each of the opposite ends 30 of the light bar 38. As used herein, "outer surface" means the surface that is primarily visible when the light bar is mounted on the motorcycle. Each aperture 68 extends through the rear-facing surface 72 and communicates with the one of the cavities 64. The apertures 68 are preferably generally horizontally-extending slots with rounded ends.

Figure 6:
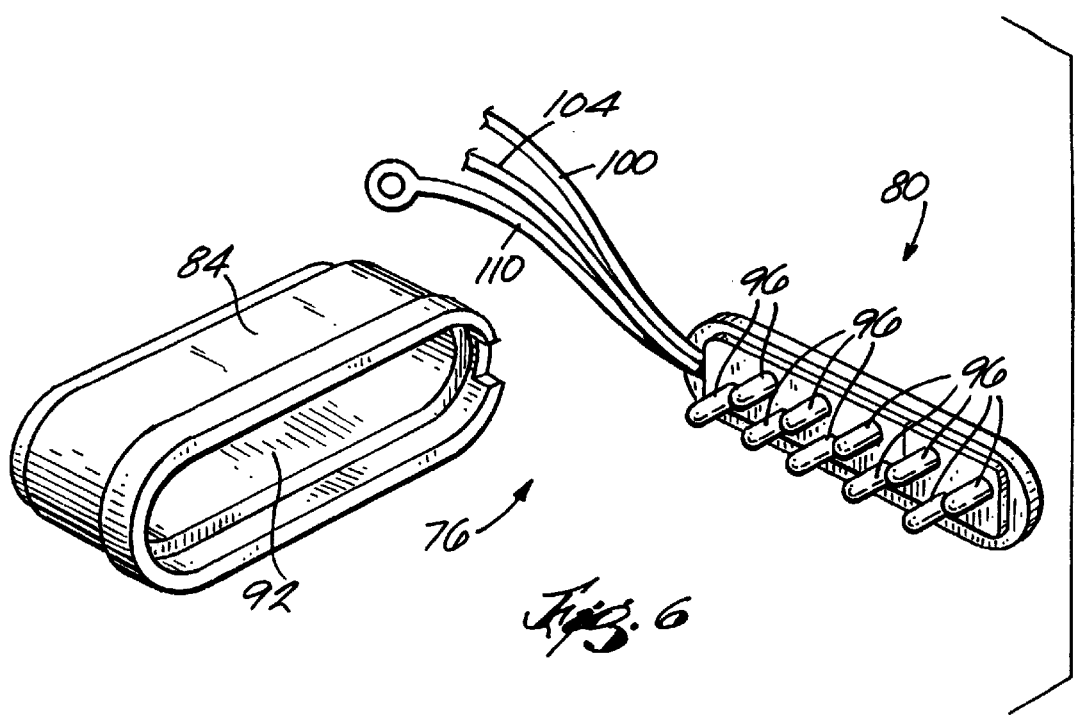
FIG. 6 is an exploded view of an LED pod and lens assembly.

An LED pod and lens assembly 76 is illustrated in FIG. 6, and includes an LED pod 80 and a lens 84. The lens 84 defines a lens cavity 92 sized to receive the LED pod 80. The LED pod 80 includes a plurality of LEDs 96, which in the preferred embodiment includes ten LEDs. A selected number, three in the preferred embodiment, of the LEDs 96 are wired to an LED running light wire 100, and constitute the LED running lights. The remaining LEDs 96 in the pod 80 are wired to an LED brake light wire 104, and constitute the LED brake lights. A ground wire 110 is also provided and extends out of the lens cavity 92. The pod 80 is glued or otherwise secured to the lens 84 to substantially capture the LED pod 80 within the lens cavity 92.

Referring now to FIGS. 3–5, one LED pod and lens assembly 76 is sized to fit within each of the cavities 64, and at least partially within each aperture 68. A surface 114 of each lens 84 is substantially flush with the rear-facing surface 72 of the light bar 38.

A retention member 118 is disposed generally across each cavity 64 and fastened in place with suitable retaining fasteners 122 positioned through retaining apertures 126. One of the mounting apertures 60 and corresponding mounting fasteners may conveniently be used to secure one end of the retention member 118. The retention members 118 therefore at least partially capture the LED pod and lens assemblies 76 within the cavities 64.

The ground wires 110 are interconnected with the light bar 38 with the retaining fasteners 122 or other suitable interconnecting means, such as a clip or solder. The LED running light wire 100 and LED brake light wire 104 are fed through a clearance aperture 130 provided in the light bar 38 and are wired into the motorcycle's electric system.

When the motorcycle 10 is operating, the motorcycle electrical system provides electricity to the LED running lights through the running light wire 100 such that the LED running lights always emit light during motorcycle operation. The motorcycle electrical system provides electricity to the LED brake lights through the brake light wire 104 only when the motorcycle 10 is operating and a brake of the motorcycle 10 is activated.

It should be noted that there are many alternative embodiments that are within the scope of the above-described directional light bar assembly invention. For example, a single cavity 64, aperture 68, lens 84, and LED pod 80 may be provided in a single LED pod and lens assembly 76 configuration. Such a configuration may be centrally located on the light bar 38, or could be expanded to extend substantially the entire length of the light bar 38 with many LEDs 96. In such a case, the LED directional light bar assembly 34 may replace the usual motorcycle taillight 22 entirely.

Also, the LED pods 80 may further include LED directional indicator lights that blink in response to a directional indicator switch on the motorcycle 10 being activated. In such a case, the motorcycle directional indicator lights 26 may be unnecessary. This would allow the light bar 38 to be made from a less rigid material (e.g., substantially flexible) because it would not have to support the weight of the motorcycle directional indicator lights 26.

Although current motorcycle design practice usually includes a substantially horizontal directional indicator light bar, the LED directional indicator light bar assembly 34 may be disposed substantially vertically, or in any other direction. An advantage of using relatively small, discrete LEDs 96 within the directional indicator light bar 38 is that the light bar may take on virtually any shape, such as a T-shape. Therefore, the invention may be used in a non-traditionally shaped directional light bar.

Although particular embodiments of the present invention have been shown and described, other alternative embodiments will be apparent to those skilled in the art and are within the intended scope of the present invention. Thus, the present invention is to be limited only by the following claims.

We claim:

1. A directional light bar assembly for a motorcycle, the directional light bar assembly comprising:

a light bar including opposite ends and adapted to be interconnected with the motorcycle;

a directional light interconnected with each of said opposite ends of said light bar; and an LED mounted on said light bar.

2. The directional light bar assembly of claim 1, wherein said light bar includes an outer surface defining an aperture, and wherein said LED is disposed generally adjacent said aperture to allow light from said LED to pass through said aperture.

3. The directional light bar assembly of claim 2, further comprising a lens positioned at least partially within said aperture, and wherein said LED is disposed generally adjacent said lens.

4. The directional light bar assembly of claim 3, wherein said lens is positioned such that a surface of said lens is substantially flush with said outer surface of said light bar.

5. The directional light bar assembly of claim 3, wherein said lens defines a lens cavity, and wherein said LED is at least partially disposed within said lens cavity.

6. The directional light bar assembly of claim 1, wherein said light bar includes an outer surface defining first and second apertures, and wherein said LED is a first LED, said directional light bar assembly further comprising a second LED, and wherein said first and second LEDs are disposed generally adjacent said first and second apertures respectively to allow light from said LEDs to pass through said apertures.

7. The directional light bar assembly of claim 6, wherein said first aperture is disposed generally adjacent one of said opposite ends of said light bar, and said second aperture is disposed generally adjacent the other of said opposite ends of said light bar.

8. The directional light bar assembly of claim 1, wherein said light bar defines a cavity, and wherein said LED is at least partially received within said cavity.

9. A directional light bar assembly for a motorcycle having a brake, said directional light bar assembly comprising:

a light bar adapted to be interconnected with a rear portion of the motorcycle, and including:
   first and second opposite ends each adapted to receive a directional light, and
   an aperture defined by said light bar;

an LED running light disposed adjacent said aperture and configured to emit light during operation of the motorcycle; and an LED brake light disposed adjacent said aperture and configured to emit light during application of the motorcycle brake.

10. The directional light bar assembly of claim 9, further comprising a lens positioned at least partially within said aperture, wherein said LED running light and said LED brake light are disposed generally adjacent said lens.

11. The directional light bar assembly of claim 10, wherein said light bar includes an outer surface, and wherein said lens is positioned such that a surface of said lens is substantially flush with said outer surface.

12. The directional light bar assembly of claim 9, further comprising a retention member at least partially capturing said LED running light and said LED brake light between said retention member and said light bar.

13. A motorcycle comprising:

a rear wheel;

a rear fender disposed generally above said rear wheel;

a light bar mounted on said motorcycle generally above said rear fender, said light bar including first and second ends;

first and second directional lights mounted to said first and second ends, respectively; and at least one LED mounted on said light bar.

14. The motorcycle of claim 13, wherein said LED is configured to emit light during operation of said motorcycle.

15. The motorcycle of claim 13, further comprising a brake, wherein said LED is configured to emit light during application of said brake.

16. The motorcycle of claim 13, further comprising a brake and said at least one LED comprising a plurality of LEDs, wherein some of said plurality of LEDs are wired to emit light when said motorcycle is operating, and some of said plurality of LEDs are wired to emit light when said brake is applied.

17. The motorcycle of claim 13, wherein said light bar defines an aperture and said LED is disposed generally adjacent said aperture to allow light from said LED to pass through said aperture.

18. The motorcycle of claim 17, further comprising a lens positioned at least partially within said aperture.

19. The motorcycle of claim 18, wherein said light bar includes a generally rear-facing surface, and wherein a surface of said lens is substantially flush with said rear-facing surface.

20. The motorcycle of claim 13, further comprising a retention member interconnected with said light bar such that said LED is at least partially captured between said retention member and said light bar.

21. The motorcycle of claim 13, wherein said light bar includes a rear-facing surface defining first and second apertures generally adjacent said first and second opposite ends, respectively, and wherein said LED is a first LED, said motorcycle further comprising:

a second LED;

first and second lenses positioned at least partially within said first and second apertures such that a surface of each of said first and second lens is substantially flush with said rear-facing surface, wherein said first LED is disposed generally adjacent said first lens and said second LED is disposed generally adjacent said second lens; and first and second retention members, said first retention member being interconnected with said light bar to at least partially capture said first LED between said first retention member and said light bar, and said second retention member being interconnected with said light bar to at least partially capture said second LED between said second retention member and said light bar.

22. A directional light bar assembly for a motorcycle, the directional light bar assembly comprising:

a light bar adapted to be interconnected with the motorcycle;

an LED mounted on said light bar; and a removable retention member interconnected with said light bar such that said LED is at least partially captured between said retention member and said light bar.

23. A motorcycle comprising:

a rear wheel;

a rear fender disposed generally above said rear wheel;

a light bar mounted on said motorcycle generally above said rear fender;

an LED mounted on said light bar; and a taillight mounted on said rear fender, wherein said light bar includes a recessed portion that fits at least partially around a portion of said taillight.

* * * * *

UNITED STATES PATENT AND TRADEMARK OFFICE
CERTIFICATE OF CORRECTION

PATENT NO : 6,053,626
DATED : April 25, 2000
INVENTOR(S): Phillip J. Zagrodnik, Gregory S. Hahn, James L. Hofmann, Jack Kainz It is certified that error appears in the above-identified patent and that said Letters Patent are hereby corrected as shown below:

Title page, item [63], under "Other Publications", insert:

--Custom Chrome 1994 Catalog - pg. 227--

Signed and Sealed this

Seventeenth Day of April, 2001

*Attest:*

NICHOLAS P. GODICI

*Attesting Officer*   Acting Director of the United States Patent and Trademark Office